United States Patent
He et al.

(10) Patent No.: US 10,291,912 B2
(45) Date of Patent: May 14, 2019

(54) CONTEXT DETERMINATION FOR ENTROPY CODING OF RUN-LENGTH ENCODED TRANSFORM COEFFICIENTS

(71) Applicant: BlackBerry Limited, Waterloo (CA)

(72) Inventors: Dake He, Waterloo (CA); Tianying Ji, Toronto (CA); Jing Wang, Waterloo (CA); Xiaofeng Wang, Markham (CA)

(73) Assignee: BlackBerry Limited, Waterloo, Ontario (CA)

( * ) Notice: Subject to any disclaimer, the term of this patent is extended or adjusted under 35 U.S.C. 154(b) by 417 days.

(21) Appl. No.: 14/760,514

(22) PCT Filed: Jan. 16, 2013

(86) PCT No.: PCT/CA2013/050021
§ 371 (c)(1),
(2) Date: Jul. 13, 2015

(87) PCT Pub. No.: WO2014/110652
PCT Pub. Date: Jul. 24, 2014

(65) Prior Publication Data
US 2015/0358621 A1 Dec. 10, 2015

(51) Int. Cl.
| | |
|---|---|
| *H04N 19/60* | (2014.01) |
| *H04N 19/13* | (2014.01) |
| *H04N 19/159* | (2014.01) |
| *H04N 19/176* | (2014.01) |
| *H04N 19/463* | (2014.01) |
| *H04N 19/14* | (2014.01) |

(Continued)

(52) U.S. Cl.
CPC ............. *H04N 19/13* (2014.11); *H04N 19/14* (2014.11); *H04N 19/159* (2014.11); *H04N 19/176* (2014.11); *H04N 19/18* (2014.11); *H04N 19/463* (2014.11); *H04N 19/593* (2014.11); *H04N 19/91* (2014.11); *H04N 19/129* (2014.11)

(58) Field of Classification Search
CPC .............................. H04N 19/13; H04N 19/60
See application file for complete search history.

(56) References Cited

U.S. PATENT DOCUMENTS

2003/0081850 A1* 5/2003 Karczewicz ......... H04N 19/176
382/247
2005/0068208 A1 3/2005 Liang et al.
(Continued)

OTHER PUBLICATIONS

Yunfei Zheng et al.: "CE11: Mode Dependent Coefficient Scanning", 4. JCT-VC Meeting; 95. MPEG Meeting, No. JCTVC-D393, Jan. 16, 2011, XP030008432.
(Continued)

*Primary Examiner* — Tracy Y. Li
(74) *Attorney, Agent, or Firm* — Rowand LLP

(57) ABSTRACT

Methods and devices for encoding and decoding video using mode-dependent context determination in the case of level-run pair coding of transform coefficients are described. Intra-coding modes may be grouped into classes and each class may be associated with a partitioning of a coefficient group into regions. The region in which a coefficient falls determines, in part, the context selected for encoding bins associated with that coefficient, including a level, if the coefficient is non-zero, and a run if the coefficient correspond to the bin of a binarized run value.

24 Claims, 12 Drawing Sheets

(51) Int. Cl.
*H04N 19/18* (2014.01)
*H04N 19/593* (2014.01)
*H04N 19/91* (2014.01)
*H04N 19/129* (2014.01)

(56) References Cited

U.S. PATENT DOCUMENTS

| | | | |
|---|---|---|---|
| 2012/0140822 A1 | 6/2012 | Wang et al. | |
| 2012/0230417 A1 | 9/2012 | Sole Rojals et al. | |
| 2012/0281768 A1 | 11/2012 | Matsuba et al. | |
| 2012/0328026 A1* | 12/2012 | Sole Rojals | H03M 7/6023 375/240.18 |
| 2013/0003837 A1* | 1/2013 | Yu | H04N 19/176 375/240.12 |
| 2013/0003859 A1 | 1/2013 | Karczewicz et al. | |
| 2013/0051475 A1* | 2/2013 | Joshi | H04N 19/159 375/240.18 |
| 2013/0136175 A1* | 5/2013 | Wang | H04N 19/00781 375/240.12 |
| 2013/0177070 A1* | 7/2013 | Seregin | H04N 19/13 375/240.02 |

OTHER PUBLICATIONS

Ken McKann: "Encoder—side description of HEVC Test Model (HM)", 3rd JCT-VC Meeting; 94. No. JCTCV-C402, Oct. 15, 2010, XP055278609.

Vivienne Sze et al.: "High Throughput CABAC Entropy Coding in HVEC", IEEE Transactions on Circuits and Systems for Video Technology, IEEE Service Center, Dec. 1, 2012, XP011487151.

Feng Yi et al.: "Low-Complexity Tools in AVS Part 7", Journal of Computer Science and Technology, KluwerAcademic Publishers, May 1, 2006, XP019411313.

EPO, Extended European Search Report relating to EP Application No. 13871597.4, dated Jun. 16, 2016.

L. Zhang, Q. Wang, N. Zhang, D. Zhao, X. Wu, W. Gao, "Context-based entropy coding in AVS video coding standard", Signal Processing: Image Communication 24(2009), pp. 263-276.

Nguyen Nguyen, Tianying Ji, Dake He, Gaëlle Martin-Cocher, and Lin Song, "Multi-level significance maps for Large Transform Units", JCTVC-G644.

J. Sole, R. Joshi, I. S. Chong, M. Coban, M. Karczewicz, "Parallel Context Processing for the significance map in high coding efficiency", JCTVC-D262.

T. Nguyen, D. Marpe, T. Wiegand, "Non-CE11, Proposed Cleanup for Transform Coefficient Coding", JCTVC-H0228.

Y. Ye and M. Karczewicz, "Improved H.264 intra coding based on bi-directional intra prediction, directional transform, and adaptive coefficient scanning," IEEE Int'l Conf. Image Process.'08 (ICIP08), San Diego, U.S.A., Oct. 2008.

G.J. Sullivan; J.-R. Ohm; W.-J. Han; T. Wiegand (May 25, 2012). "Overview of the High Efficiency Video Coding (HEVC) Standard" (PDF). IEEE Trans. on Circuits and Systems for Video Technology.

Yunfei Zheng, Muhammed Coban, Xianglin Wang, Joel Sole, Rajan Joshi, Marta Karczewicz, "CE11: Mode Dependent Coefficient Scanning", JCTVC-D393.

International Search Report dated Sep. 17, 2013, PCT/CA2013/050021.

* cited by examiner

CONTEXT DETERMINATION FOR ENTROPY CODING OF RUN-LENGTH ENCODED TRANSFORM COEFFICIENTS

COPYRIGHT NOTICE

A portion of the disclosure of this document and accompanying materials contains material to which a claim for copyright is made. The copyright owner has no objection to the facsimile reproduction by anyone of the patent document or the patent disclosure, as it appears in the Patent and Trademark Office files or records, but reserves all other copyright rights whatsoever.

FIELD

The present application generally relates to data compression and, in particular, to methods and devices for coding transform coefficients in context-adaptive binary entropy coding of video.

BACKGROUND

Data compression occurs in a number of contexts. It is very commonly used in communications and computer networking to store, transmit, and reproduce information efficiently. It finds particular application in the encoding of images, audio and video. Video presents a significant challenge to data compression because of the large amount of data required for each video frame and the speed with which encoding and decoding often needs to occur. The advanced Audio and Video coding Standards ("AVS") is an existing audio and video coding standard developed in China. Work is set to begin on developing a next-generation standard to replace AVS, which may be known as AVS2.

Many video coding standards use block-based coding processes. In these processes, the image or frame is divided into blocks, typically 4×4 or 8×8, although non-square blocks may be used in some cases, and the blocks are spectrally transformed into coefficients, quantized, and entropy encoded. In many cases, the data being transformed is not the actual pixel data, but is residual data following a prediction operation. Predictions can be intra-frame, i.e. block-to-block within the frame/image, or inter-frame, i.e. between frames (also called motion prediction).

To compress data, the coding of the quantized transform coefficients is designed to take advantage of characteristics of the transform to improve compression. In the case of AVS, the coefficients are coded using a quadruple: level, run, sign, end-of-block (EOB) flag. The coding is in a reverse zig-zag direction starting from the last non-zero coefficient in a transform block (hence the requirement for the EOB flag).

The level-minus-one and run data is binarized using unary binarization and the bins are then coded using context-based entropy coding. AVS specifically uses arithmetic coding for the transform coefficient data.

There are some drawbacks to the existing coding scheme for AVS. In some cases, long runs can occur. In the case of a 32×32 block, the worst case run is 1023. When binarized, this results in a number with 1024 bins to be coded. The EOB flags present a similar worst-case overhead. For example, with a 32×32 block the worst case scenario is 1024 non-zero coefficients, which means 1023 EOB flags. Finally, due to the coding scheme adopted for AVS, the decoder does not have any a priori knowledge regarding the location of transform coefficients within the block until all transform coefficients have been decoded. This prevents this data from being used to improve context determination or other coding decisions.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
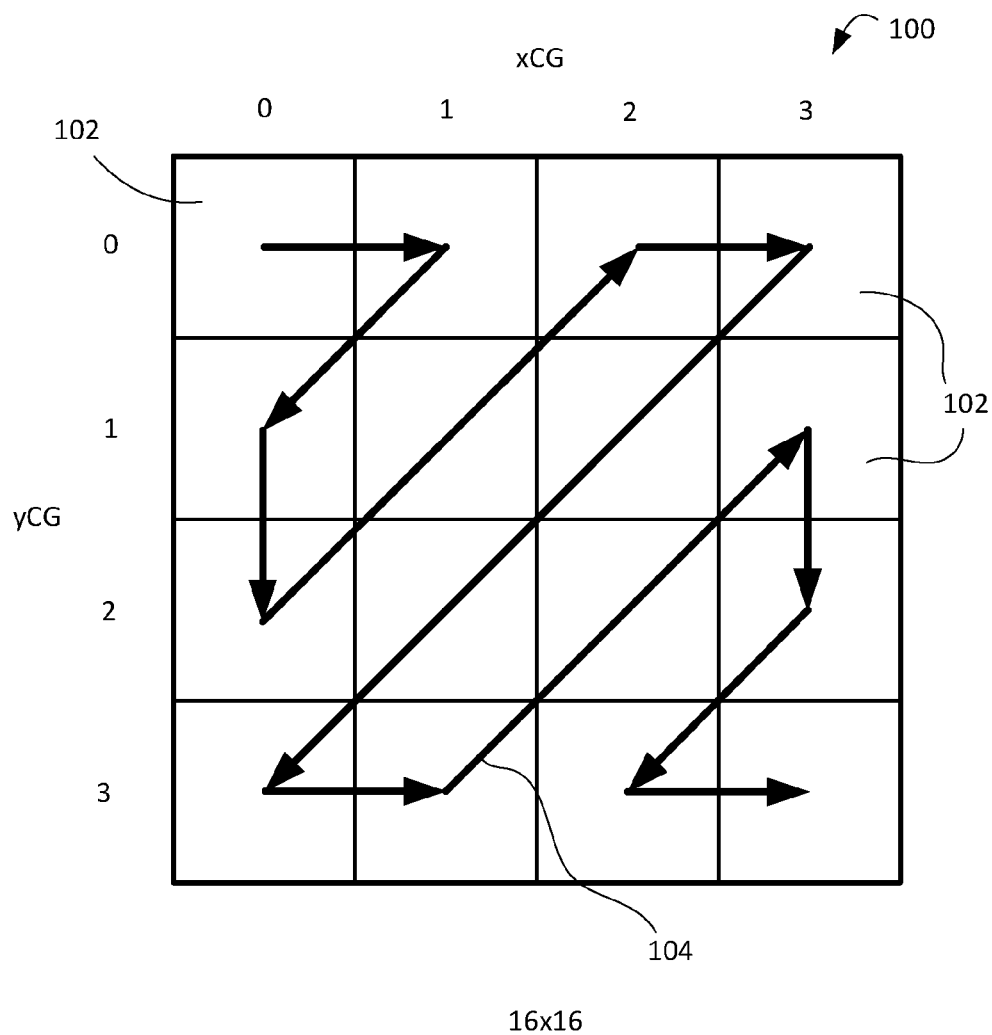
FIG. 1 shows an example of a transform block partitioned into coefficient groups and illustrates a zig-zag group scan order.

In a first aspect, the present application describes a method of decoding video from a bitstream of encoded video using a video decoder, the video including a picture partitioned into blocks. The method includes, for a coefficient group within a transform block, decoding data identifying an intra-coding mode used in generating the transform block; partitioning the coefficient group into regions based on the intra-coding mode; and entropy decoding a bin for reconstructing the coefficients of the coefficient group, wherein the entropy decoding includes determining a context based upon which region is associated with that bin.

The present application further discloses a method of encoding video using a video encoder, the video including a picture partitioned into blocks. The method includes generating residual data for one of the blocks from spatial prediction of that block using an intra-coding mode; spectrally transforming the residual data to obtain a transform block of transform coefficients, the transform block being further partitioned into coefficient groups; level-run coding the transform coefficients of one of the coefficient groups to generate level-run pairs; and binarizing and entropy coding the level-run pairs, including determining a context for each bin of the binarized level-run pairs, wherein the coefficient group is partitioned into regions based on the intra-coding mode, and wherein determining the context for a bin is at least partly based upon which region is associated with that bin.

In a further aspect, the present application describes encoders and decoders configured to implement such methods of encoding and decoding.

In yet a further aspect, the present application describes non-transitory computer-readable media storing computer-executable program instructions which, when executed, configured a processor to perform the described methods of encoding and/or decoding.

Other aspects and features of the present application will be understood by those of ordinary skill in the art from a review of the following description of examples in conjunction with the accompanying figures.

In the description that follows, some example embodiments are described with reference to the AVS standard for video coding and/or the developing AVS2 standard. Those ordinarily skilled in the art will understand that the present application is not limited to AVS or AVS2 but may be applicable to other video coding/decoding standards, including possible future standards, multi-view coding standards, scalable video coding standards, and reconfigurable video coding standards.

In the description that follows, when referring to video or images the terms frame, picture, slice, tile and rectangular slice group may be used somewhat interchangeably. A series of frames/pictures may be called a "sequence" in some cases. Other terms may be used in other implementations. It will also be appreciated that certain encoding/decoding operations might be performed on a frame-by-frame basis, some are performed on a slice-by-slice basis, some picture-by-picture, some tile-by-tile, and some by rectangular slice group, depending on the particular requirements or terminology of the applicable image or video coding standard. In any particular embodiment, the applicable image or video coding standard may determine whether the operations described below are performed in connection with frames and/or slices and/or pictures and/or tiles and/or rectangular slice groups, as the case may be. Accordingly, those ordinarily skilled in the art will understand, in light of the present disclosure, whether particular operations or processes described herein and particular references to frames, slices, pictures, tiles, rectangular slice groups are applicable to frames, slices, pictures, tiles, rectangular slice groups, or some or all of those for a given embodiment. This also applies to coding tree units, coding units, prediction units, transform units, etc., as will become apparent in light of the description below. The term "block" may be used to refer to a coding tree unit, coding unit, prediction unit, or transform unit, depending on the context in which it is used.

It will be understood that the encoder or the decoder described herein may each be implemented on an application-specific or general purpose computing device, containing one or more processing elements and memory. The operations performed by the encoder or decoder, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder or decoder may be implemented will be appreciated by those ordinarily skilled in the art having regard to the following description.

The encoder receives a video source and produces an encoded bitstream. The decoder receives the encoded bitstream and outputs a decoded video frame. The decoder may be implemented as part of a video playback device, i.e. the output video may be displayed on a display device. It will be understood that the video playback machine, such as a computer, set-top box, DVD or Blu-Ray player, and/or mobile handheld device, may buffer decoded frames in a memory prior to display on a display device. The encoder and decoder may be configured to operate in conformance with a number of video compression standards. For example, the encoder and decoder may be AVS-compliant. In other embodiments, the encoder and decoder may conform to other video compression standards, including evolutions of the AVS standard, like AVS2.

As with any block-based hybrid coding framework, AVS partitions a picture/frame into blocks. A prediction operation is used to generate a prediction block. The prediction may be spatial prediction, i.e. intra prediction, in which local reconstructed pixels are the basis for the prediction, or the prediction may be temporal prediction, i.e. inter prediction, in which reconstructed pixels from nearby pictures/frames are the basis for the prediction. The difference between the prediction block and the original data is a residual or error that is then encoded.

The residual is encoded by first spectrally transforming the residual using, for example, a DCT (or DST, or wavelet transform, etc.) operation to transform the block of residual data to a block of transform coefficients. The upper-left-most coefficient is the DC coefficient and the other coefficients are progressively higher frequency coefficients the further they are away from the upper-left-most coefficient. In many cases, the bottom right portion of the transform block is likely to contain all zero coefficients, which is why the spectral transform assists in compression.

The transform coefficients are then quantized using a quantization step size. In some cases, the quantization step size may be fixed for a given sequence, picture/frame, or block. In some cases, the quantization step size is more generically a quantization matrix, in which different coefficient positions in a transform block may be subjected to quantization using a position-specific quantization step size. The transform and quantization operations are integrated into a single operation in some embodiments. In some cases, the description herein may refer to quantized transform coefficients as "transform coefficients" or "coefficients" for brevity. It will be appreciated that when referring to the entropy encoding of "transform coefficients" or "coefficients", those transform coefficients will typically have been quantized.

The block of quantized transform coefficients are entropy encoded in accordance with the syntax and coding scheme prescribed by the applicable coding standard. In the case of AVS, the coefficients are read in a reverse scan order, where the scan order is defined as a zig-zag scan order progressing from the upper-left-most coefficient to the bottom-right-most coefficient. The actual encoding in AVS starts with the last significant coefficient in the block, i.e. the last non-zero coefficient in the scan order, and proceeds in reverse scan order back towards the upper-left-most coefficient. The data encoded includes quadruples of [level, run, sign, EOB]. The level indicates the magnitude of a current non-zero coefficient (minus 1), the run indicates the number of zero coefficients between the current coefficient and the next non-zero coefficient in reverse scan order, the sign indicates the sign of the non-zero coefficient, and the EOB flag indicates whether this current coefficient is the 'first' non-zero coefficient in the scan order in the block, i.e. whether this is the last non-zero coefficient to be coded in reverse scan order for this block.

The run and level values are binarized using unary binarization. The binarized data is then context-adaptive entropy encoded.

As noted above, the EOB flags represent a significant overhead cost in blocks that have relatively many non-zero coefficients. Moreover, the run value may be large in sparse blocks with at least one high-frequency non-zero coefficient, which leads to encoding a large number of bins due to the unary binarization scheme. Finally, the decoder does not know the positions in the block of any of the data being decoded until it has finished decoding all the transform coefficient data and has detected the EOB flag indicating that the current non-zero coefficient finishes the data for the block.

The present application provides for methods and systems that eliminate the use of EOB flags through signaling last significant-coefficient data. Moreover, to improve compression efficiency in the transform coding using this scheme, the present application provides for methods and system in which each block is further partitioned into non-overlapping coefficient groups. In many embodiments, the coefficient groups are square blocks, e.g. 4×4, although in some embodiments they may be non-square. In some cases a coefficient group may be referred to as "sub-block" or a "sub-coded block".

Reference is now made to FIG. 1, which shows an example of a transform block 100. In this case, the transform block 100 is a 16×16 block of transform coefficients. The transform block 100 has been partitioned into sixteen 4×4 coefficient groups (CGs), some of which are labeled by reference numeral 102. Each of the coefficient groups 102 contains sixteen transform coefficients.

The encoding of the transform coefficients is performed coefficient-group-by-coefficient-group. That is, the sixteen transform coefficients of one coefficient group are encoded before moving to the next coefficient group.

A group scan order 104 is indicated in FIG. 1. The group scan order 106 in this example is a zig-zag scan order starting at the upper-left-most coefficient group and progressing towards the lower-rightmost coefficient group. In some embodiments, the coefficient groups are encoded/decoded in reverse group scan order, meaning that the upper-left-most coefficient group is the last coefficient group to be encoded/decoded.

Figure 2:
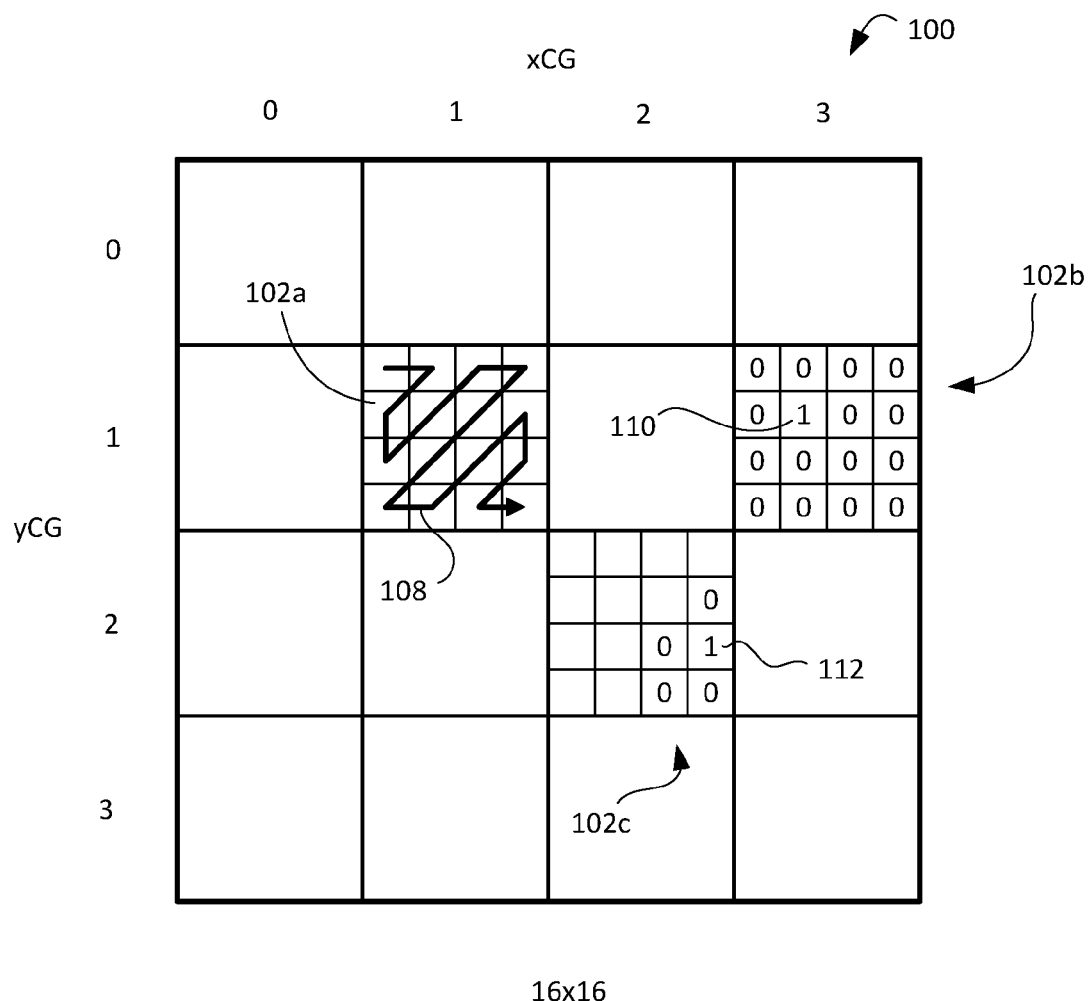
FIG. 2 shows the example transform block of FIG. 1, with an example of a zig-zag scan order in a coefficient group.

Reference is now also made to FIG. 2, which shows the transform block 100 and a scan order 108 within one of the coefficient groups 102a. The scan order 108 within a coefficient group orders the processing of the coefficients within that coefficient group. In this example, the scan order 108 is a zig-zag scan ordering of the coefficients. In some embodiments, the coefficients are encoded/decoded, specifically their level-run-sign data, in the reverse of the scan order 108 ("reverse scan order"). The reverse scan order starts at the bottom-right-most coefficient and progresses in zig-zag scan towards the upper-left-most coefficient.

It will be understood that the zig-zag-based scan order and group scan order described in these examples represent one possible set of scan orders. The scan order or the group scan order in other embodiments may be diagonal, vertical, horizontal, or any other prescribed ordering of the positions in the block and/or coefficient group. In one embodiment, the group scan order and the scan order within a coefficient group may be different, i.e. one may be zig-zag and the other may be diagonal, for example.

The partitioning of the transform block 100 into coefficient groups 102 (shown as 102a, 102b, 102c) enables the use of a CG flag to signal whether a particular coefficient group contains any non-zero coefficients or not. If all coefficients of a coefficient group are zero, then the encoder need not encode any data other than the CG flag. That is, the encoder only encodes level, run, and sign data for coefficient groups that have non-zero coefficients, e.g. those coefficient groups that have a CG flag set to one. In some cases, the CG flag of the upper-left-most coefficient group may be presumed to be set to one; that is, the CG flag of this coefficient group is not coded and the coefficients (their level-run-sign data) are always coded.

In some embodiments, the CG flags may be sent as a set and then the coefficient data for each non-zero CG sent in reverse group scan order. In some other embodiments, each CG flag that indicates that the CG contains a non-zero coefficient may be followed in the encoded bitstream by the data for that CG, e.g. the level, run, and sign data, before the next CG flag is encoded (i.e. the CG flags may be interleaved with the level-run-sign data).

Rather than sending EOB flags, the present application proposes that the position of the last non-zero coefficient in the transform block be coded. Once the decoder knows the position of the last non-zero coefficient in the transform block, then as it decodes level-run data, it will know when it has reached the last coefficient in the coefficient group, making EOB flags unnecessary. Moreover, the present application proposes to code two-level last coefficient position information: (a) the position of the last coefficient group in the group scan order that contains a non-zero coefficient, and (b) the position of the last non-zero coefficient in that last coefficient group. Thus the decoder will know the coordinates of the last non-zero coefficient and, therefore, the positional information associated with all the subsequently-decoded CG flags, level, run, and sign data for the transform block.

FIG. 2 shows a non-zero coefficient 110 in the coefficient group 102b and a non-zero coefficient 112 in the coefficient group 102c. Under the old AVS coding approach, the non-zero coefficient 112 would be the last coefficient in reverse zig-zag scan order across the whole transform block 100. However, in accordance with this example embodiment of the present application, the last non-zero coefficient group in reverse group scan order is coefficient group 102b, and the last non-zero coefficient within that coefficient group is the non-zero coefficient 110. Accordingly, the encoder encodes the position of coefficient group 102b and the position of the non-zero coefficient 110 within that coefficient group 102b. The encoder then goes on to encode the CG flags for the remaining coefficient groups between the last coefficient group 102b and the upper-left-most coefficient group (for which the CG flag may be inferred to be 1), and the level-run-sign data for each coefficient group that has an associated CG flag set to be (or inferred to be) 1. As will be described later below, the last coefficient position within each non-zero CG may also be encoded, in some example embodiments. In other embodiments, a "last run" may be encoded for the next CG to specify the number of zeros between the bottom-right-most coefficient and the last non-zero coefficient in that next CG, or, in some embodiments, the run data may cross CG boundaries (and may skip over all-zero CGs in the reverse group scan order).

Figure 3:
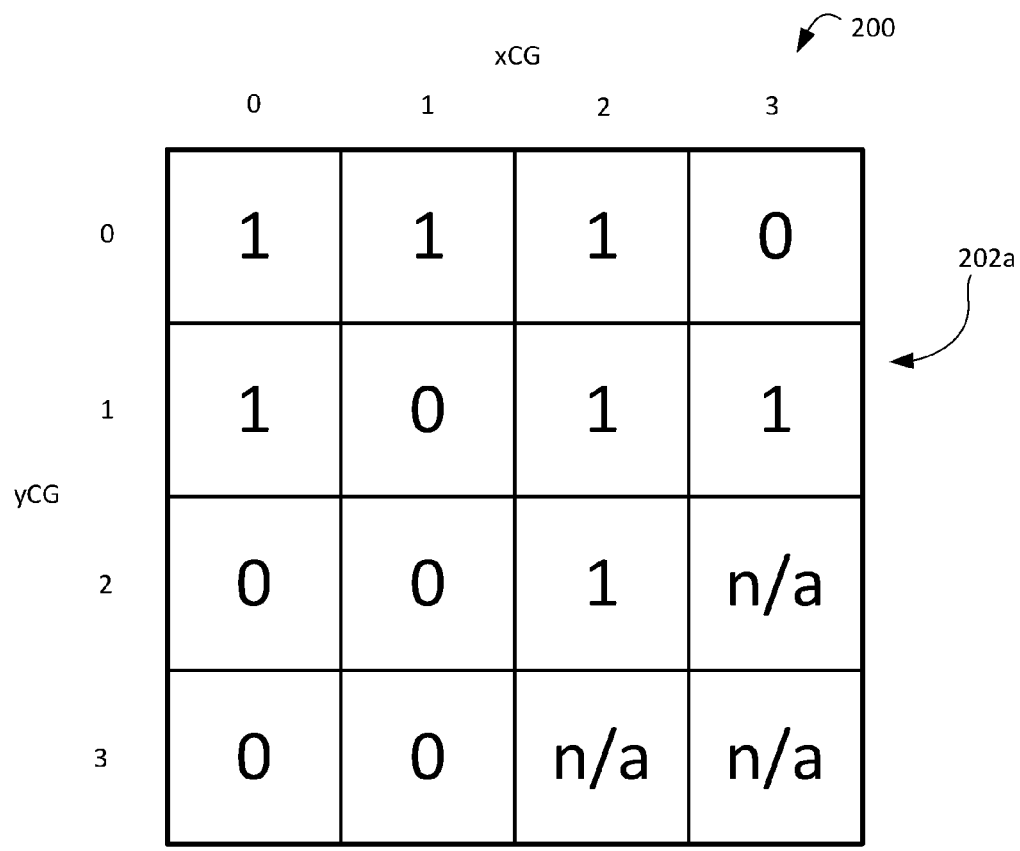
FIG. 3 shows one example of CG flags mapped to a transform block.

FIG. 3 shows an example 16×16 transform block 200 partitioned into 4×4 coefficient groups. The last coefficient group 202a is located at xCG=3, yCG=1. These coordinates may be binarized and encoded in some embodiments. In other embodiments, the position of the last non-zero coefficient group may be signaled as the coefficient group's position in the group scan order, which in this example is 12 (in the range 0, 1, . . . , 15). The value of the CG flags for respective coefficient groups is shown in the associated coefficient group in FIG. 3. It will be appreciated that the CG flag for the last coefficient group 202a need not be encoded since it is known to contain non-zero coefficients on the basis that it is the last coefficient group. In some embodiments, the CG flag for the first coefficient group at xCG=0, yCG=0 may also be inferred to be 1, irrespective of whether it contains any non-zero coefficients, since the likelihood of this coefficient group having all zero coefficients is very small. If both these CG flags are omitted (as indicated by square brackets below), then the coded CG flags in reverse group scan order, for this example, are:

[1] 1 0 0 0 1 0 1 0 0 1 1 [1]

Figure 4:
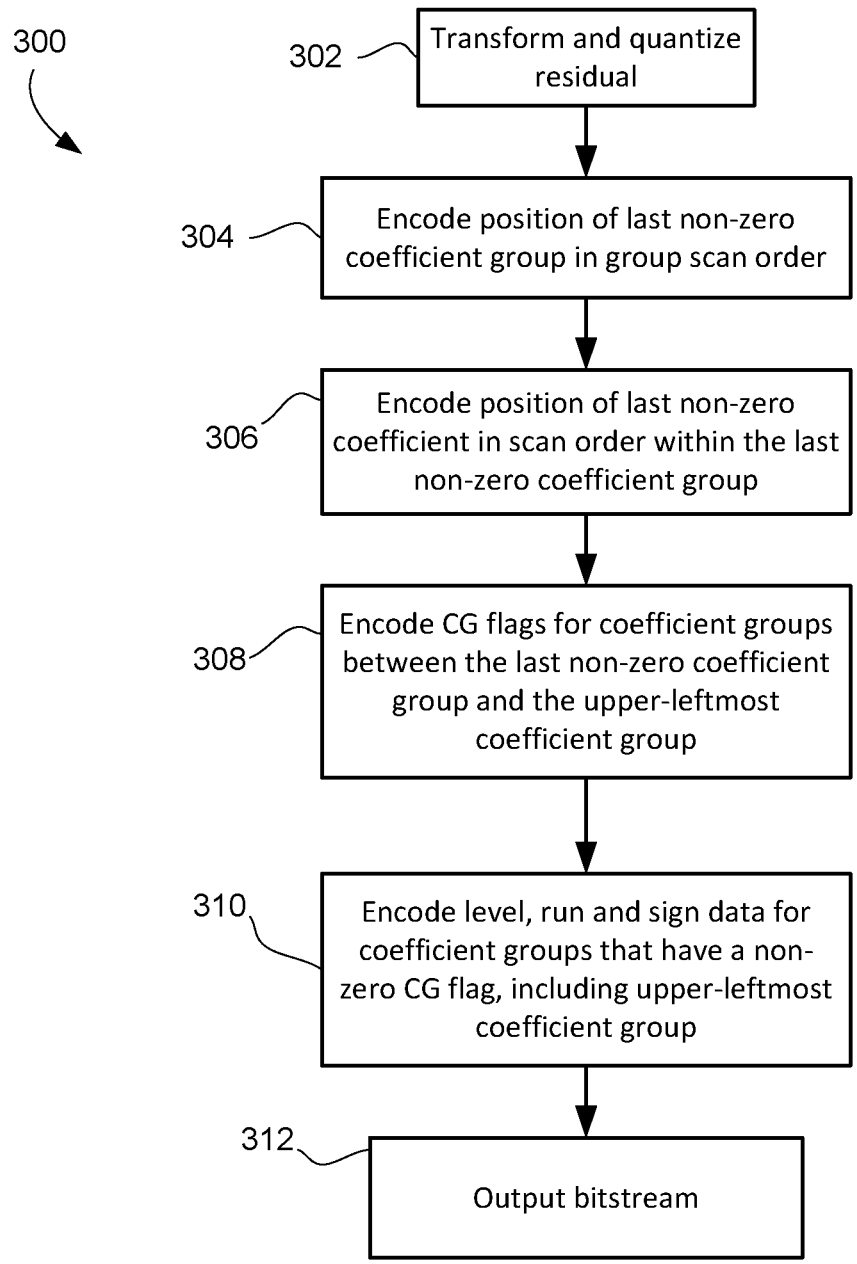
FIG. 4 shows, in flowchart form, one embodiment of a method of encoding using level-run information and coefficient group partitioning.

Reference is now made to FIG. 4, which shows in flowchart form, one example process 300 for encoding transform coefficients in a video encoder. As noted in operation 302, the block of residual data is first transformed and quantized to produce the block of quantized transform coefficients. Recall that the present example embodiment supposes that the transform block, whether 8×8, 16×16, 32×32 or some other size, is partitioned into coefficient groups. The coefficient groups may be square groups of transform coefficients. In some cases, they may be 2×2, 4×4, 6×6, 8×8, or some other size. The coefficient group size may depend on the transform block size in some implementations.

In operation 304, the encoder encodes the position of the last non-zero coefficient group in group scan order. Group scan order is the ordering of the coefficient groups from upper-left-most to bottom-right-most. In this example, the group scan order may be a zig-zag scan order. The last of these coefficient groups that contains a non-zero coefficient is the last non-zero coefficient group. Its position in the transform block is encoded in operation 304.

In operation 306, the encoder encodes the position of the last non-zero coefficient in that last non-zero coefficient group. The position encoded is the position within the coefficient group and not the absolute position within the transform block, since the coefficient group position has already been encoded. The last non-zero coefficient in that coefficient group is the last non-zero coefficient in the scan order within the coefficient group.

The CG flags for all coefficient groups between the last non-zero coefficient group and the upper-left-most coefficient group, in reverse group scan order, are then encoded in operation 308. In this embodiment, the CG flags are not interleaved with level-run data.

In operation 310 the level, run, and sign data for the coefficient groups that have non-zero coefficients are then encoded. This includes the coefficient groups for which the CG flag may be inferred to be 1, irrespective of whether it contains non-zero coefficients, such as the upper-left-most coefficient group in some embodiments.

Finally, in operation 312, the encoded data is output in the bitstream.

Figure 5:
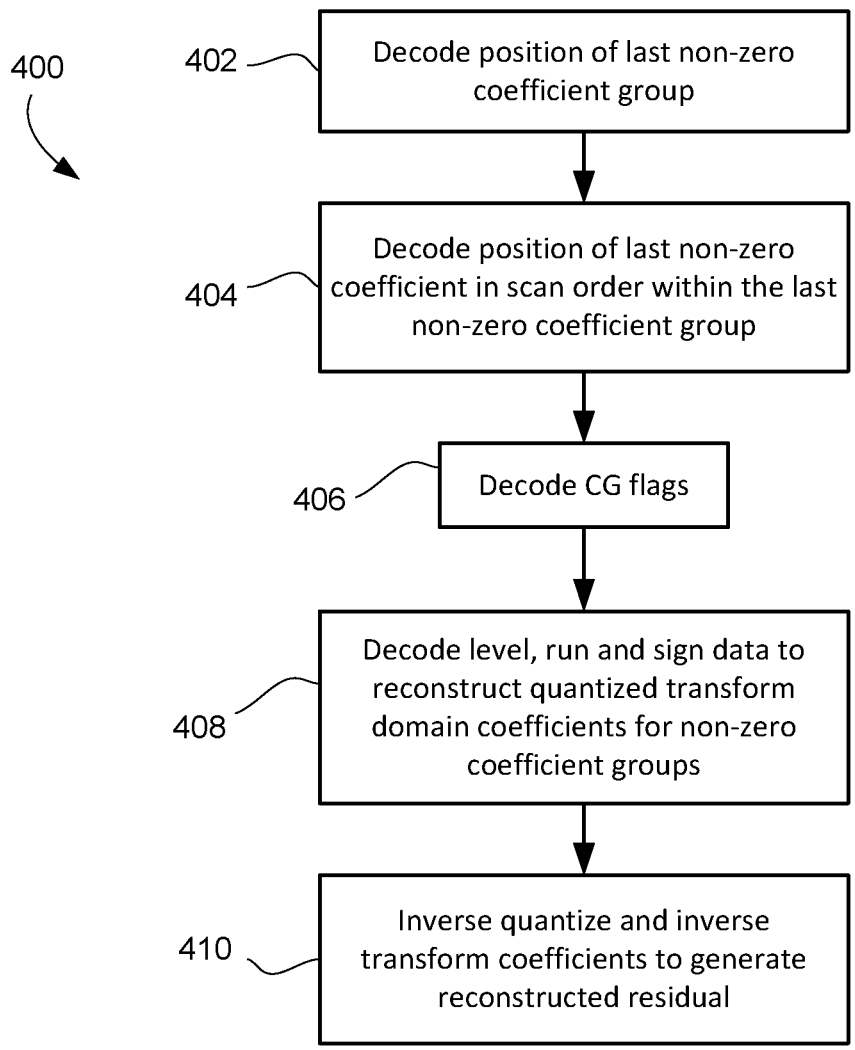
FIG. 5 shows, in flowchart form, one embodiment of a method of decoding level-run information to reconstruct a residual.

The corresponding operation at the decoder is illustrated in flowchart form in the example process 400 shown in FIG. 5. At operation 402, the decoder decodes the position of the last non-zero coefficient group in the group scan order. Thus the decoder is able to identify which coefficient group in the transform block is the last coefficient group in group scan order that contains a non-zero coefficient. In operation 404, the decoder then decodes the position of that last non-zero coefficient in scan order within the last non-zero coefficient group.

The decoder then decodes the coefficient group flags in operation 406. A CG flag may be decoded for each coefficient group between the last non-zero coefficient group and the upper-left-most coefficient group in reverse group scan order. Note that this example presumes that the CG flag for the upper-left-most coefficient group is inferred to be 1, although in other example embodiments it may be encoded/decoded. Thus the decoder is able to identify which coefficient groups in the transform block contain non-zero coefficients and, thus, whether they have had level, run, and sign data encoded for their coefficients.

In operation 408, the decoder decodes level, run and sign data for the non-zero coefficient groups so as to reconstruct the quantized transform domain coefficients for those coefficient groups. As will be detailed below, the decoder may decode last-run data for each non-zero coefficient group, last non-zero coefficient position data for each non-zero coefficient group, or run data that span coefficient group boundaries, depending on the implementation. The all-zero coefficient groups are reconstructed as all zero coefficients.

In operation 410, the decoder inverse quantizes and inverse transforms the reconstructed transform block of coefficients so as to generate a reconstructed residual block. Through combination with subsequent prediction operations, filtering, etc., the decoder outputs reconstructed pixel data.

It will be understood that some operations of the above-described processes can be varied such that they occur in a different order, or interleaved, or in combination, as will be understood by those skilled in the art having regard to the full description herein.

Coding Last Non-Zero CG Position

As described above, the present application provides for signaling the position of the last non-zero coefficient, in part, by encoding the position of the last coefficient group in group scan order that contains a non-zero coefficient. There are various ways that this position can be encoded. Some examples are provided below.

In one example, the last non-zero coefficient group position is signaled using x-y coordinates. For example, xCG may indicate the x-position and yCG may indicate the y-position. Each of these values may be binarized by, for example, unary binarization. In another embodiment, fixed-length binary numerals may be used.

The binarized x-y coordinates are then encoded using context-adaptive encoding. The context for coding the binarized coordinates may be determined based upon the block size and the bin index of the specific bin being coded. Separate context may be used for xCG and yCG. In one example, the context determination may be given by:

ctxInc(lastCGX)=0, if block size is 8×8 and bin index=0;

2, if block size is 16×16 and bin index=0;

4, if block size is 16×16 and bin index=1;

6, if block size is 16×16 and bin index=2;

8, if block size is 32×32 and bin index=0;

10, if block size is 32×32 and bin index=1;

12, if block size is 32×32 and bin index>1;

ctxInc(lastCGY)=1, if block size is 8×8 and bin index=0;

3, if block size is 16×16 and bin index=0;

5, if block size is 16×16 and bin index=1;

7, if block size is 16×16 and bin index=2;

9, if block size is 32×32 and bin index=0;

11, if block size is 32×32 and bin index=1;

13, if block size is 32×32 and bin index>1;

In this example, a total of 28 contexts may be used: 14 for luma components and 14 for chroma components.

In another example, the binarization of the x-y coordinates may be based upon a concatenation of a unary prefix and a fixed-length suffix. Note that this may not change the binarized coordinates until the block size reaches 32×32, assuming 4×4 coefficient groups. The suffix may be a single bit. The suffix may then be coded using bypass mode, i.e. equal probability, which avoids a context determination step with respect to coding of that bin. The context for coding the prefix is determined based upon block size and bin index.

In another variation to these examples, the xCG and yCG positions are jointly coded; meaning that a flag is introduced for signaling whether the last non-zero coefficient group is the upper-left-most coefficient group at (0, 0), which tends to be the most probable last non-zero coefficient group. If the flag is set, then no further coding of xCG and yCG is necessary. However if the flag is not set, then the xCG value and yCG value are encoded. But, because the encoder and decoder will know that the xCG and yCG values cannot both be 0, if the encoded/decoded xCG value is zero, then the yCG value will be encoded and decoded as (yCG−1). Example psuedocode illustrating this variation is set out below:

```
Encoder:
    Encode( lastCGX == 0 && lastCGY == 0 )
    if( !( lastCGX == 0 && lastCGY == 0 ) )
    {
        Encode( lastCGX )
        If( lastCGX == 0 )
        {
            Encode( lastCGY − 1 )
        }
        Else
        {
            Encode( lastCGY )
        }
    }
Decoder:
    Decode( lastCG0Flag )
    if( lastCG0Flag == 1 )
    {
        lastCGX == 0
        lastCGY == 0
    }
    Else
```

```
    {
        Decode( lastCGX )
        If( lastCGX == 0 )
        {
            Decode( lastCGYminus1)
            lastCGY = lastCGYminus1 + 1;
        }
        Else
        {
            Decode( lastCGY )
        }
    }
```

In another example, the last non-zero coefficient group position is signaled using its index in the group scan order. The group scan order orders the coefficient groups from the upper-left-most, at index 0, to the lower-rightmost, at index N×N−1, where N×N is the total number of coefficient groups. The group scan position number is binarized and encoded.

Coding Last Non-Zero Coefficient Position in Last Non-Zero CG

As noted above, the position of the last non-zero coefficient in a transform block is signaled by encoding the position of the last non-zero coefficient group and the position of the last non-zero coefficient in that last non-zero coefficient group. The position of the last non-zero coefficient in the last non-zero coefficient group may be encoded in a manner similar to that described above with respect to coefficient groups, i.e. the x-y coordinates of the coefficient within the coefficient group may be encoded or the position of the coefficient in the scan order within the coefficient group may be encoded.

Because the present application prescribes the partitioning of the transform block into coefficient groups and level-run coding is used to encode/decode coefficient data, the issue of runs that cross coefficient group boundaries needs to be addressed. Using the coefficient group partitioning, the level-run coding takes place using a scan order within each coefficient group. As a result, the run between non-zero coefficients may extend across a coefficient group boundary.

Figure 6:
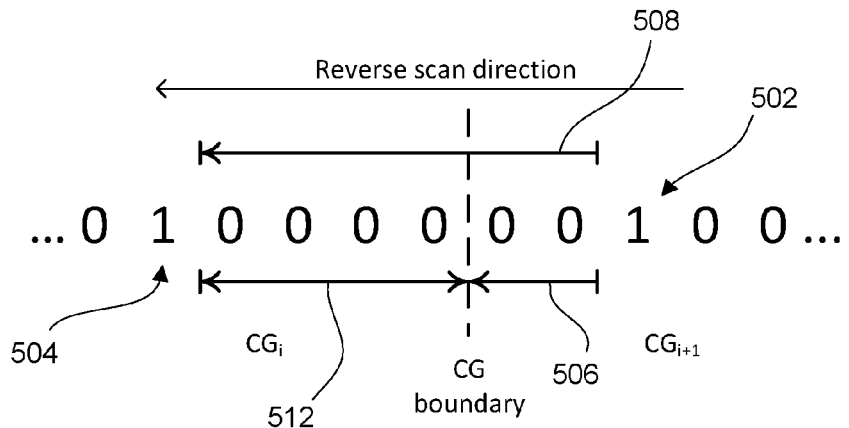
FIG. 6 graphically illustrates an example of level-run coding truncated at a coefficient group boundary.

Reference is now made to FIG. 6, which illustrates two possibilities for run signaling. Coefficient group $CG_{i+1}$ is first encoded/decoded using run, level, and sign data. As indicated, the coding progresses in reverse scan order. The last level-run pair is for coding the coefficient indicated by reference numeral 502. There are two possible approaches to coding the run. One is to code the run 508 that extends across the coefficient group boundary up to the next non-zero coefficient. That is, the run 508 in this example would be 6. The other approach is to coding a truncated run 506. The truncated run 506 stops at the coefficient group boundary, and in this case the run 506 would have a value of 2. It will be appreciated that coding a truncated run will typically result in shorter runs, which is therefore more efficient; however, truncated runs leave the problem of how to code the next coefficient group, i.e. $CG_i$.

If truncated runs are coded, then one possible approach is to encode the position of the last non-zero coefficient for every non-zero coefficient group. That is, each coefficient group for which its associated CG flag is set to 1 would also have the position of its last non-zero coefficient encoded. In this example, the position of coefficient 504 in coefficient group $CG_i$ would be encoded in the bitstream. As will the last non-zero coefficient in the transform block, the coding of the position of each coefficient group's last non-zero coefficient may be based upon x-y coordinates or position in the scan order.

Figure 8:
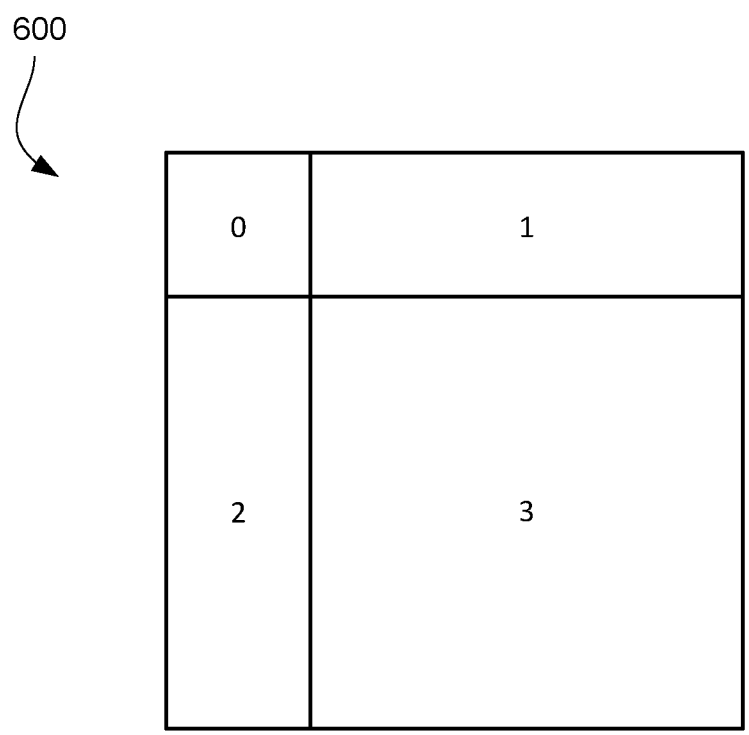
FIG. 8 shows an example of a region partition of a transform block.

The context for coding the position of the last non-zero coefficient may partly depend on the bin index once the position data is binarized, but may also depend on the location of the coefficient group in the block. Reference is now made to FIG. 8, which shows an example 16×16 transform block 600 and regional partitions for context determination. In this case, the block has been divided into four regions. Region 0 is the upper-left-most coefficient group. Region 1 includes the three coefficient groups to the right of the upper-left-most coefficient group and region 2 includes the three coefficient groups below the upper-left-most coefficient group. The other nine coefficient groups are in region 3. The context for coding x and y positions, for example, may be given by:

ctxInc(lastPositionX)=regionIndex*6+binIndex ctxInc(lastPositionY)=regionIndex*6+binIndex+3

This example would result in a total of 48 contexts: 24 for luma and 24 for chroma.

Due to the property of the DCT transform, coefficients in CGs in region 1 correspond to the vertical components while coefficients in CGs in region 2 correspond to the horizontal components. Therefore, when the prediction residual contains mostly vertical components, non-zero transform coefficients tend to be located close to the top of the CGs in region 2. Similarly, when the prediction residual contains mostly horizontal components, non-zero transform coefficients tend to be located close to the left of the CGs in region 1. The positions of the last coefficients in CGs in region 1 and region 2 thus show symmetry in this case.

As a result, in one embodiment coding the Y-coordinate in region 2 may share the same contexts as coding the X-coordinate in region 1, and coding the X-coordinate in region 2 may share the same contexts as coding the Y-coordinate in region 1. This is also equivalent to swapping the (X, Y) coordinates of the last coefficient position in CGs in region 2 and coding it using the contexts for region 1.

Another possible approach to handling truncated runs at a coefficient group boundary is to encode/decode the "last run" 512, i.e. the run of zeros from the bottom-right-most coefficient in a coefficient group to the first non-zero coefficient in reverse scan order. Once again, unary binarization may be used in some embodiments. The context for coding the last run 512 may be derived from the position of the coefficient group in the block (as described above), the bin index, and the maximum prior-coded level (i.e. rank). The "rank" is a value linked to the largest level previously coded for that transform block. In one example implementation, rank is determined as:

rank=0, if maximum coded level=0

1, if maximum coded level=1

2, if maximum coded level=2

3, if maximum coded level=3 or 4

4, if maximum coded level>4

In this example, the context may be determined as follows:

ctxInc(lastRun)=rank*2+min(1,binIndex), if the CG is the top-left CG in the block rank*2+min(1,binIndex)+10, otherwise As noted above, the CG flag of the upper-left-most coefficient group may be inferred to be 1, since it is highly likely that this coefficient group contains at least one non-zero coefficient. In the unlikely case that it does not contain any non-zero coefficients, then a special signal may be sent to indicate that situation. For example, in the case where last run is coded, a special last run value of lastRun=16 may be encoded. Note that lastRun=16 would only be signaled when the significant CG flag has been inferred to be 1.

Figure 7:
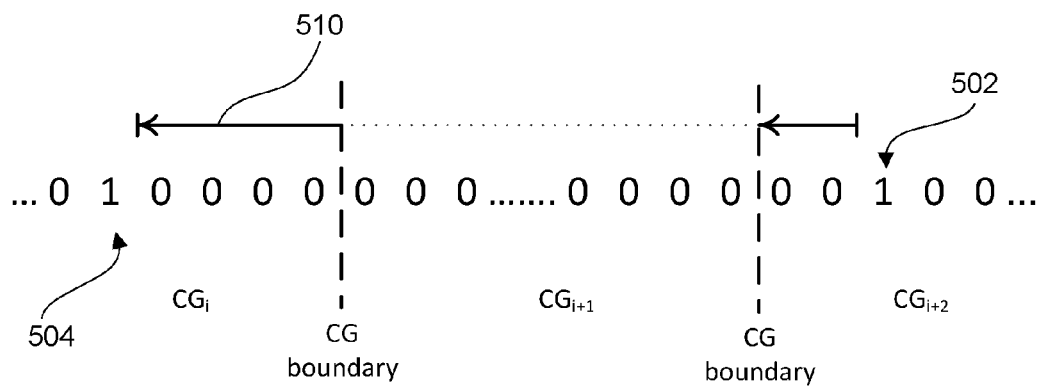
FIG. 7 graphically illustrates an example of level-run coding over coefficient group boundaries.

Reference is now made to FIG. 7, which shows an example embodiment of non-truncated run signaling. In the case where the run 510 is not truncated at a coefficient group boundary, it may be configured to exclude coefficients from all zero coefficient groups in calculating the run. That is, only coefficients in coefficient groups that have an associated CG flag set to 1 are counted in determining the run 510, skipping over any all zero coefficient groups that are encountered in the reverse group scan order, like $CG_{i+1}$ in this example.

Figure 9:
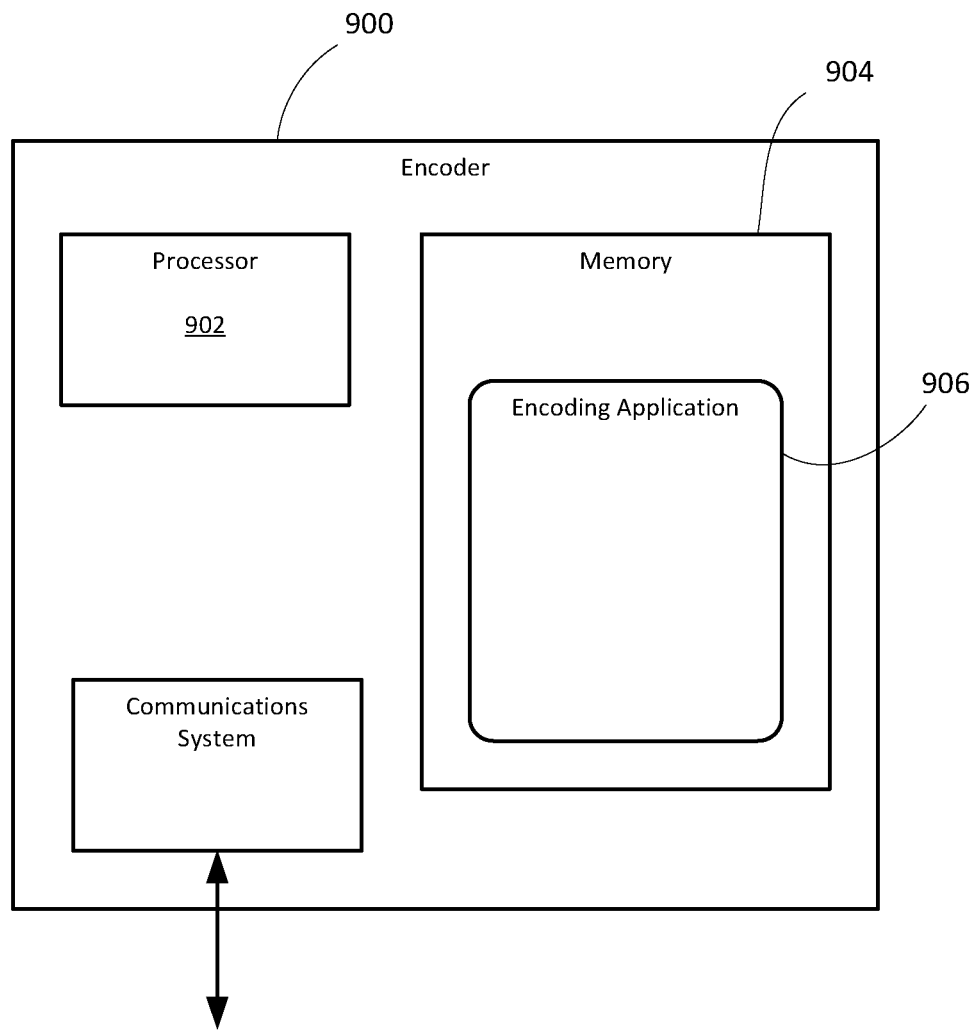
FIG. 9 shows, in block diagram form, one embodiment of a video encoder.

Reference is now made to FIG. 9, which shows a simplified block diagram of an example embodiment of an encoder 900. The encoder 900 includes a processor 902, memory 904, and an encoding application 906. The encoding application 906 may include a computer program or application stored in memory 904 and containing instructions for configuring the processor 902 to perform operations such as those described herein. For example, the encoding application 906 may encode and output bitstreams encoded in accordance with the processes described herein. It will be understood that the encoding application 906 may be stored in on a computer readable medium, such as a compact disc, flash memory device, random access memory, hard drive, etc.

Figure 10:
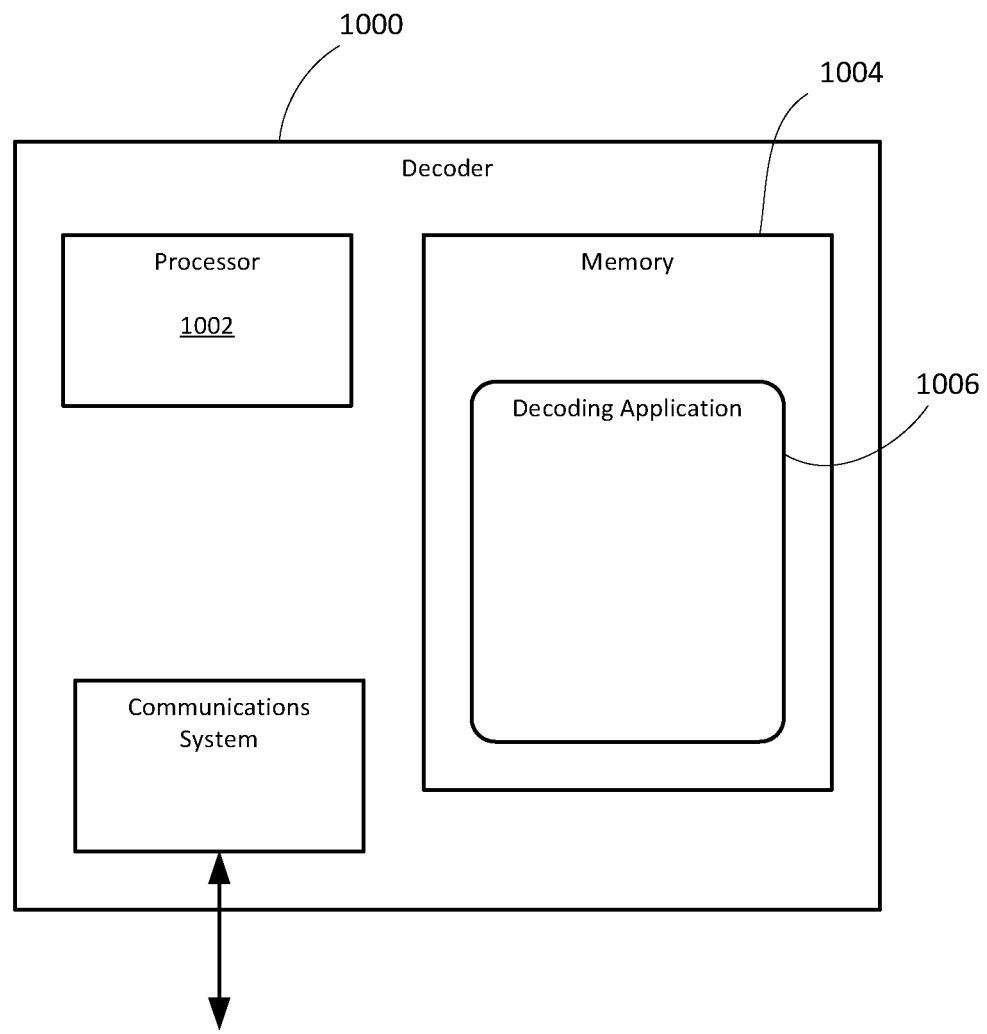
FIG. 10 shows, in block diagram form, one embodiment of a video decoder.

Reference is now also made to FIG. 10, which shows a simplified block diagram of an example embodiment of a decoder 1000. The decoder 1000 includes a processor 1002, a memory 1004, and a decoding application 1006. The decoding application 1006 may include a computer program or application stored in memory 1004 and containing instructions for configuring the processor 1002 to perform operations such as those described herein. It will be understood that the decoding application 1006 may be stored in on a computer readable medium, such as a compact disc, flash memory device, random access memory, hard drive, etc.

Context Determination for Entropy Coding

Many of the encoding and decoding processes described above signal positional information (or information from which position can be derived) in the context of encoding/decoding coefficient data. The elements being encoded and decoded include CG flags, levels, runs, etc. The fact that both the encoder and decoder are in possession of current positional information with respect to an element being encoded or decoded means that this positional information can be used to improve context determination. Other changes and improvements may also or alternatively be made to context determination in connection with the entropy encoding and decoding of these various elements. A number of examples are outlined in detail below. It should be emphasized that the following example context models are illustrative, and are not intended to reflect the full range of possible context models that use positional information and related data to derive context. Some implementations may resemble one or more of the following context models, but various contexts may be combined/re-used to reduce the number of contexts that need to be tracked and to improve statistical accuracy for contexts that are less frequently used.

Context Models for Level Coding

In current models for AVS or AVS2, the context determination for coding level bins is dependent upon the maximum prior-coded level for that transform block. This quantity is denoted "rank" and is defined as:

rank=0, if maximum coded level=0

1, if maximum coded level=1

2, if maximum coded level=2

3, if maximum coded level=3 or 4

4, if maximum coded level>4

In one aspect of the present application additional and/or alternative information is used to determine the context for level coding.

In a first example, the position of the coefficient group in the transform block is used. In one embodiment, this means that one context set is used for the upper-left-most coefficient group and a different context set is used for the other coefficient groups. Within each context set, the context is determined based upon rank and bin index, as shown in the following:

ctxInc(Level)=rank*2+min(1,binIndex), if the CG is the top-left CG in the block rank*2+min(1,binIndex)+10, otherwise Other positional-based conditions may be used. For example, the first context set may be for the upper-left-most coefficient group and its right and lower neighbouring coefficient groups.

Figure 11:
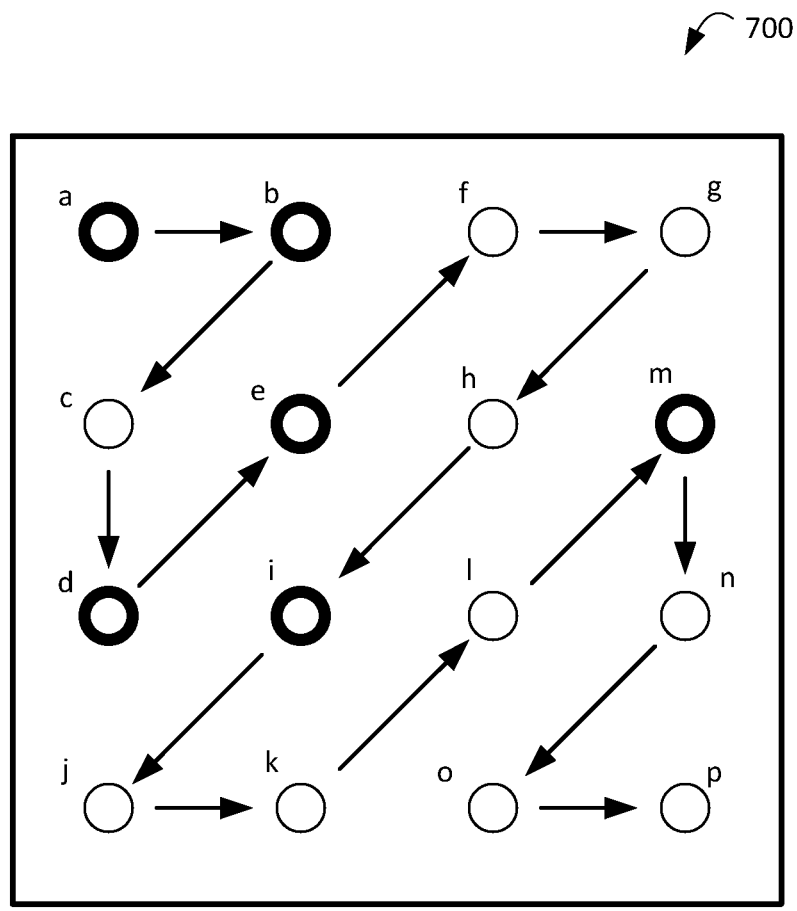
FIG. 11 shows an example coefficient group containing zero and non-zero coefficients.

In a second example, a sum of the non-zero coefficients previously-coded in reverse scan order may be the basis for selecting a context for coding level data for a current coefficient. Reference is made to FIG. 11, which shows an example coefficient group 700. The coefficient group 700 is a 4×4 coefficient group containing 16 coefficients. The coefficients with darker outlines are non-zero coefficients in this example. A maximum N may be set as the maximum number of previously-coded coefficient positions to use in determining the sum. In this example, only coefficient locations inside the coefficient group are permitted to be included in the sum. The maximum N acts as a sliding window, in a sense. For the purposes of this example, N is set to 6. In other words, the encoder or decoder look back six positions in the reverse scan order and sum the value of those six coefficients (some or all of which may be zero).

In the present embodiment, the following calculations are made when determining context for coding levels of the non-zero coefficients in position a, b and m:

absSum($a$)=abs($b$)+abs($c$)+abs($d$)+abs($e$)+abs($f$)+abs($g$)=abs($b$)+abs($d$)+abs($e$)

absSum($b$)=abs($c$)+abs($d$)+abs($e$)+abs($f$)+abs($g$)+abs($h$)=abs($d$)+abs($e$)

absSum($m$)=abs($n$)+abs($o$)+abs($p$)=0

By limiting the number of coefficients to a preselected maximum number, the sum tends to reflect more localized information than the rank value. In one embodiment, the context determination for coding bins of a level value may be derived from the absSum, the position of the coefficient group, and the bin index:

ctxInc(Level)=min(4,floor((absSum+1)/2))*2+min(1, binIndex), if the CG is the top-left CG in the block min(4,floor((absSum+1)/2))*2+min(1,binIndex)+10, otherwise Note that "level" in many implementations is coded as level-1 since it is already known to be non-zero. Accordingly, the following change may be made to the determination of absolute sums:

absMinus1Sum($a$)=max(0,abs($b$)−1)+max(0,abs($c$)−1)+max(0,abs($d$)−1)+max(0,abs($e$)−1)+max(0, abs($f$)−1)+max(0,abs($g$)−1)

absMinus2Sum($a$)=max(0,abs($b$)−2)+max(0,abs($c$)−2)+max(0,abs($d$)−2)+max(0,abs($e$)−2)+max(0, abs($f$)−2)+max(0,abs($g$)−2)

In this embodiment, the context for coding the bins of a level value is determined based upon absMinus1Sum, absMinus2Sum, rank, and the bin index, as follows:

ctxInc(Level)= rank, if rank<=1 and binIndex=0;

(rank−2)*3+min(2,floor((absMinus1Sum+1)/2))+2, if rank>1 and binIndex=0;

rank+11, if rank<=2 and binIndex=1;

(rank−3)*3+min(2,floor((absMinus2Sum+1)/2))+14, otherwise

Figure 18:
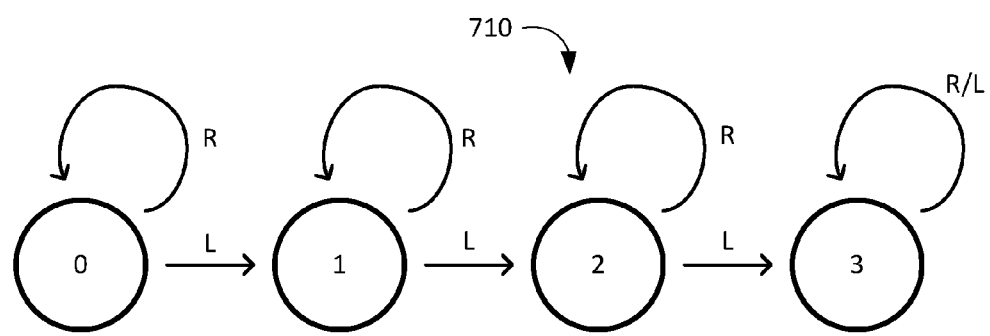
FIG. 18 illustrates a finite state machine for context determination.

In a third example, instead of using the levels of the coefficients (absSum) a count of the number of previously-coded coefficients in the coefficient group may be used. In such an example, a finite-state machine may be used, as illustrated in FIG. 18, which shows the state transitions of such a finite-state machine 710 in one exemplary embodiment. The finite-state machine 710 begins with the coding of each coefficient group in state 0, where it remains until a level is coded, as indicated by 'L'. Each zero-coefficient results in an increment to a current run, as indicated by 'R'. With each level coded, i.e. with each non-zero coefficient, it transitions to the next state until three levels have been coded, after which it remains in state s=3, in this embodiment.

In this embodiment the state 's' (ranging from 0 to 3) is used, at least in part, to determine the context for coding bins of the level being currently coded. For example, the first level coded in a coefficient group would have s=0, the second level code would have s=1, etc., until the fourth and subsequent levels coded for that coefficient group, which would all have s=3. The context determination, in one embodiment, may be given by:

ctxInc(Level)=rank*8+$s$*2+min(1,binIndex)

In another embodiment, the state levels may be quantized and the context determination given by:

ctxInc(Level)=rank*6+min(2,($s$+1)/2)*2+min(1,binIndex)

Context Models for Run Coding

In AVS2, the context model used in run coding is based on rank and the level in the same level-run pair. In another aspect of the present application, additional and/or alternative information is used to determine the context for run coding. In particular, in various embodiments context may depend, at least in part, upon coefficient group position, coefficient positions, or prior-coded coefficients within the coefficient group.

Figure 12:
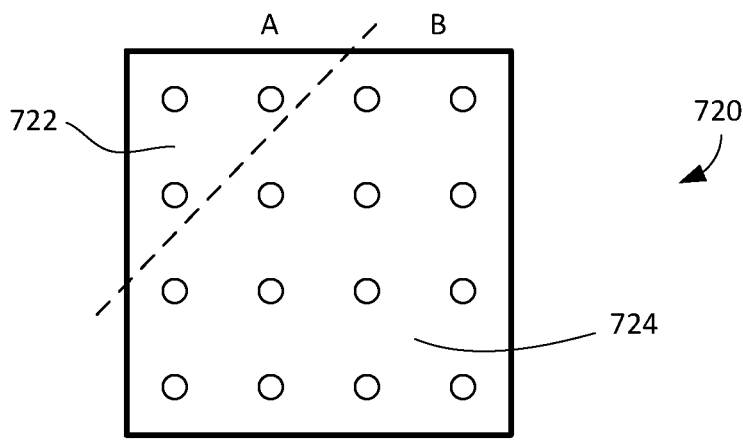
FIG. 12 shows an example diagonal partitioning of a coefficient group.
Figure 13:
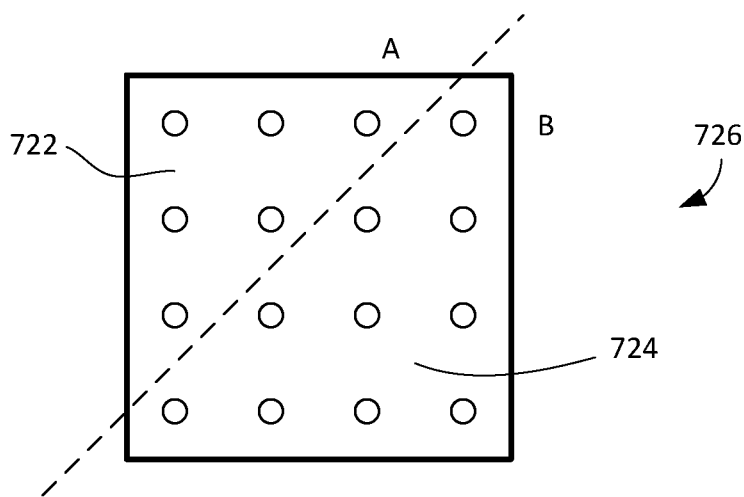
FIG. 13 shows a second example diagonal partitioning of a coefficient group.

In a first example, the context for coding the bins of a run value may be derived from the position of the coefficient group in the transform block. It may further depend upon rank and absLevel, as given by:

ctxInc(Run)= rank*4+(absLevel>1)*2+min(1,binIndex), if the CG is the top-left CG in the block rank*4+(absLevel>1)*2+min(1,binIndex)+20, otherwise In a second example, the context determination is at least partly based upon the absolute sum of the coefficients (or a subset of coefficients) already coded with respect to the current coefficient group. As was described above in connection with FIG. 11, the previously-coded coefficients included in the sum may be capped at a maximum of 6, for example. The context determination would then be given by:

ctxInc(Run)= min(4,(absSum+1)/2)*2+min(1,binIndex), if the CG is the top-left CG in the block min(4,(absSum+1)/2)*2+min(1,binIndex)+10,otherwise In a third example, the context determination depends on division of the coefficient group into regions and in which region the non-zero coefficient in the level-run pair is located. Reference is made to FIG. 12, which shows a coefficient group 720 divided into a region A 722 and a region B 724 by a diagonal partitioning of the coefficient group 720. In this embodiment, the three coefficients in the upper-left corner fall into region A 722 and the rest of the coefficients fall into region B 724. Reference is now also made to FIG. 13, which shows another coefficient group 726 with a different partitioning into region A 722 and region B 724.

In the embodiments illustrated in FIGS. 12 and 13, the partitioning is aligned with the scan order such that whether a coefficient is located in region A 722 or region B 724 may be determined from its index in the scan order. With respect to coefficient group 720, a coefficient is in region A if scanPos<3. With respect to coefficient group 726, a coefficient is in region A if scanPos<6. In the first embodiment, the context determination may be given by:

If the CG is the top-left CG in the block and the CG is the last non-zero CG in the block ctxInc(Run)=min(4,(absSum+1)/2)*8+(scanPos<3)
*2+min(1,binIndex), Else if the CG is the top-left CG in the block ctxInc(Run)=min(4,(absSum+1)/2)*8+4+min(1,binIndex), Else ctxInc(Run)=min(4,(absSum+1)/2)*8+6+min(1,binIndex).

In a different embodiment, based on the diagonal shown in FIG. 13, the context determination is given by:

If the CG is the top-left CG ctxInc(Run)=min(4,(absSum+1)/2)*6+(scanPos<6)
*2+min(1,binIndex), Else ctxInc(Run)=min(4,(absSum+1)/2)*6+4+min(1,binIndex)

In these two embodiments, the region test is only applied in the case of the upper-left-most coefficient group, on the basis that the DC coefficient of the transform block and some surrounding coefficients may use separate contexts. Nonetheless, region-based context determination may be applied in other coefficient groups in other embodiments.

It will also be appreciated that although these two embodiments rely upon a diagonal partition of the coefficient group, which allows scan position to be used to determine region, in other embodiments different regions may be defined. For example, region A could be defined as the coefficients at (0,0), (0,1), (1,0), and (1,1); the coefficients in the first row; or the coefficients in the first column. Other regions could be defined. In one embodiment the coefficient group may be partitioned into more than two regions.

Context Models for CG Flag Coding

In order to determine the context for coding CG flags, the values of one or more previously-processed CG flags in the transform block may be used. For example, the CG flags of the two previous coefficient groups in the reverse group scan order may be used to determine context for coding the current CG flag.

The context for coding CG flags may also, or alternatively, be based upon the position of the associated coefficient group in the transform block. For example, referring again to FIG. 8, different context sets may be used depending on whether the coefficient group is located in region 1, 2 or 3. Recall that the CG flag of region 0 (the upper-left-most coefficient group) may be inferred to be 1, in which case it is not coded.

Below, CGflagA is used to denote the immediately previous coefficient group in reverse group scan order, and CGflagB to denote the next previous coefficient group in reverse group scan order. In one example, the context determination may be given by:

If the CG is in a 8×8 block ctxInc(CGflag)=(CGflagA*2+CGflagB)*3+regionIndex−1

Else ctxInc(CGflag)=(CGflagA*2+CGflagB)*3+regionIndex−1+12

In yet another embodiment, the context determination is based upon one or more previously-coded CG flags, subject to the requirement that the previous CG flags are in the same region of the transform block. The regions may be as defined by the partitioning of FIG. 8, for example.

Intra-Specific Context Determination for Entropy Coding

Like H.264/AVC, HEVC, and other video coding standards, AVS2 uses a number of possible intra-prediction modes or directions. In particular, AVS2 currently defines the following intra-prediction modes:

Mode 0—Vertical mode
Mode 1—Horizontal mode
Mode 2—DC mode
Mode 3—Down left
Mode 4—Down right
Mode 5—Horizontal down mode
Mode 6—Vertical left mode
Mode 7—Horizontal up mode
Mode 8—Vertical right mode There is a fairly strong correlation between the intra-prediction mode used and the residual distribution in the block of residuals. For example, horizontal mode tends to result in residuals in the left-most columns of the block of residuals. Vertical mode tends to result in residuals in the upper-most rows of the block of residuals.

Some existing coding standards, like H.264 or HEVC, try to make use of this correlation to improve efficiency. For example, the intra-prediction mode is used as the basis for selecting a transform. Certain transforms may be predefined that are designed to efficiently compact data falls in a particular region or pattern in the residual block. In another example, the coefficient scanning may be mode dependent. That is, the intra-prediction mode used may determine whether the block is coded using a diagonal, horizontal or vertical scan order.

In one aspect, the present application proposes that context determination for coding of transform coefficient data be based, at least in part, upon the intra-prediction mode used. The mode-dependent context determination may be used in coding the position of the last non-zero coefficient in each coefficient group (if it is being signaled, as described above), and/or the level-run pairs in each coefficient group. The context set selected for entropy coding may be based upon the intra-prediction mode used. For example, a different context set may be used when entropy coding coefficient data obtained using horizontal prediction versus coefficient data obtained using vertical prediction.

In one embodiment, the inter-coded frames/pictures may share a context set with at least one of the intra-prediction modes. In another embodiment, the inter-coded data uses its own context set(s).

As outlined above, some video coding standards have a large number of intra-prediction modes. In the case of AVS2, there are nine modes, some of which produce somewhat statistically similar residual distributions. For example, vertical, vertical-left, and vertical-right tend to all produce a residual distribution with non-zero residual values in the upper-most rows. Accordingly, in one embodiment, the intra-prediction modes are grouped and one context set is used for that group of modes. In a specific embodiment, the modes are classified into three groups: horizontal, vertical, and diagonal. The diagonal set includes the down-left, down-right and DC modes. Example pseudo-code for classifying the modes is set out below:

```
if( INTRA_PREDICTION_MODE == VERT_PRED ||
    INTRA_PREDICTION_MODE == VERT_LEFT_PRED ||
    INTRA_PREDICTION_MODE == VERT_RIGHT_PRED )
{
    intraModeIdx = INTRA_PRED_VER = 0;
}
else if( INTRA_PREDICTION_MODE == HOR_PRED ||
    INTRA_PREDICTION_MODE == HOR_DOWN_PRED ||
    INTRA_PREDICTION_MODE == HOR_UP_PRED )
{
    intraModeIdx = INTRA_PRED_HOR = 1;
}
else if( INTRA_PREDICTION_MODE == DC_PRED ||
    INTRA_PREDICTION_MODE == DOWN_LEFT_PRED ||
    INTRA_PREDICTION_MODE == DOWN_RIGHT_PRED )
{
    intraModeIdx = INTRA_PRED_DC_DIAG = 2;
}
```

In this example, the value "intraModeIdx" indicates whether the intra-coding was of class 0, 1, or 2.

For context derivation, the coefficient groups may be partitioned into regions. The intra-mode used for obtaining the transform coefficients may be the basis for selecting a partitioning. In one example, a predefined partitioning is defined for each of the mode classes.

Figure 14:
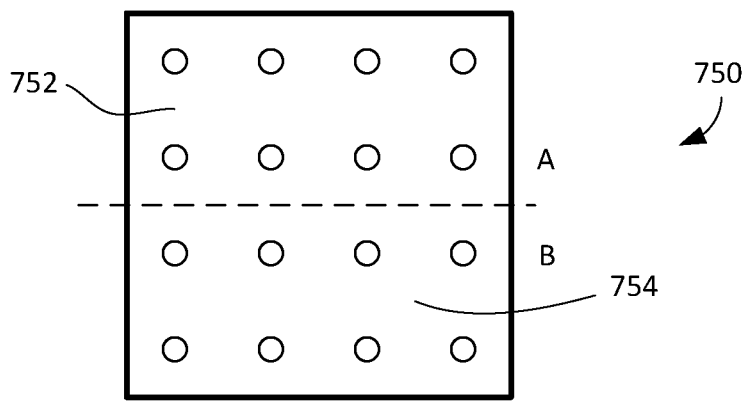
FIG. 14 shows an example horizontal partitioning of a coefficient group.
Figure 15:
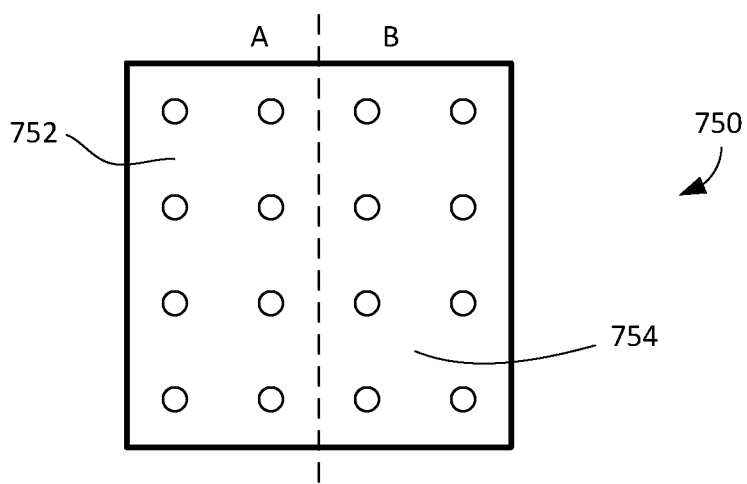
FIG. 15 shows an example vertical partitioning of a coefficient group.
Figure 16:
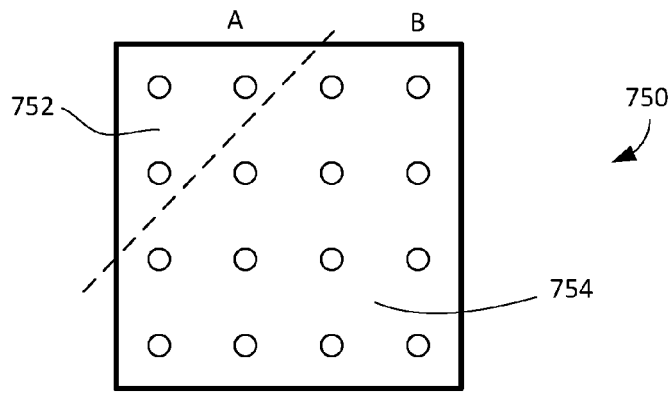
FIG. 16 shows an example diagonal partitioning of a coefficient group.

Reference is now made to FIGS. 14, 15 and 16, which show an example of partitioning of a 4×4 coefficient group 750 for the vertical class, horizontal class, and diagonal class, respectively. FIG. 14 shows the partitioning of the coefficient group 750 into region A 752 and region B 754 using a horizontal partition. This partitioning is intended for use with the vertical modes. FIG. 15 shows the coefficient group 750 partitioned by a vertical division into region A 752 and region B 754. This partitioning is intended for use with the horizontal modes. FIG. 16 shows the coefficient group 750 partitioned by a diagonal division into region A 752 and region B 754. This partitioning is intended for use with the diagonal modes. As a result, there are six different context sets in this example:

intraModeRegionIdx=INTRA_PRED_VER_A=0;

intraModeRegionIdx=INTRA_PRED_VER_B=1;

intraModeRegionIdx=INTRA_PRED_HOR_A=2;

intraModeRegionIdx=INTRA_PRED_HOR_B=3;

intraModeRegionIdx=INTRA_PRED_DC_DIAG_A=4;

intraModeRegionIdx=INTRA_PRED_DC_DIAG_B=5;

Context Derivation for Level Coding

When coding the bins of a level, the position of the non-zero coefficient falls into one of the regions in the coefficient group. Accordingly, the region can be used together with intra-coding mode information to help determine the context for coding those bins. In one example embodiment, the region and mode information is only used for the upper-left-most coefficient group, which results in a context determination given by:

ctxInc(Level)=intraModeRegionIdx*10+rank*2+min
    (1,binIndex), if top-left CG rank*2+min(1,bin-
    Index)+60,otherwise In another embodiment, the region and mode information impact context set selection in all coefficient groups. In one example, this may be implemented as:

ctxInc(Level)=intraModeRegionIdx*10+rank*2+min
    (1,binIndex), if top-left CG intraModeRegion-
    Idx*10+rank*2+min(1,binIndex)+60, otherwise In yet another embodiment, the region and mode information are used together with the state information 's', described above in connection with FIG. 18, for context determination. In one example this may be implemented as:

ctxInc(Level)=intraModeRegionIdx*30+rank*6+min
    (2,(s+1)/2)+min(1,binIndex), if top-left CG intraModeRegionIdx*30+rank*6+min(2,(s+1)/2)+min
    (1,binIndex)+180,otherwise Context Derivation for Run Coding With level coding, the bins of the level value are all associated with or 'located' at the position of the non-zero coefficient they represent. With run coding, this is not really the case. The run value indicates how many zero value coefficients precede the current non-zero coefficient in the scan order. Once binarized into unary, if one were to map the bins of the binarized run value to the coefficients in reverse scan order from the current non-zero coefficient, then each bin indicates whether its correspondingly mapped coefficient is non-zero or not, i.e. the bins of the run value are like a significance map. In this sense, the bins of the run value may be 'located' or associated with coefficients in different regions of the partitioned coefficient group.

Figure 17:
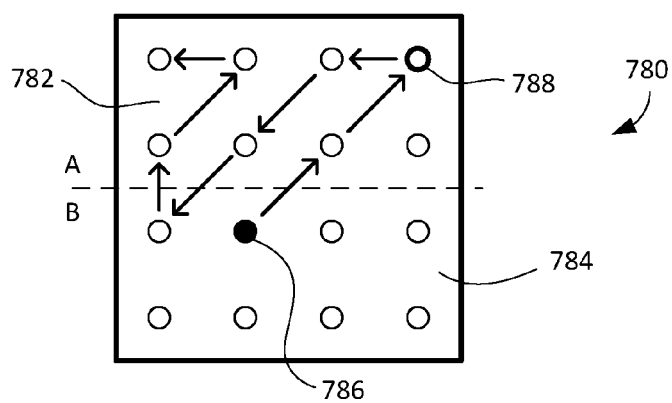
FIG. 17 shows an example coefficient group to illustrate the determination of region for bins of a binarized run value.

Reference is now made to FIG. 17, which shows an example coefficient group 780. In this example, one of the vertical modes of intra-prediction was used, hence the coefficient group 780 is divided by a horizontal partition into a region A 782 and a region B 784. The current non-zero coefficient being encoded/decoded is denoted 786. The reverse scan order is indicated by the arrows. The current non-zero coefficient 786 falls in region B 784.

The run (presuming one or more of the next coefficients in reverse scan order are zero) will relate to associated or mapped coefficients that fall in region A 782. For example the second bin of the run value may be said to correspond to the coefficient in position 788. The value of that bin indicates whether the coefficient in position 788 is zero or non-zero. Accordingly, in some embodiments, when coding the bins of a run value, the 'region' index may be configured to change from bin-to-bin depending on where the corresponding position is located. For example:

```
if(intraModeIdx = INTRA_PRED_VER &&
    region(positionCurrentPair,binIndexCurrentRun)== A )
{
        intraModeRegionIdx = INTRA_PRED_VER_A;
}
```

In some other embodiments, the bins of a run value may have their context determined based upon the region in which the associated level value (i.e. the current non-zero coefficient) lies. In either case, the region (as indicated by intraModeRegionIdx) may be used to help determine the context to use in coding the bins of a run value for at least one coefficient group in the transform block. Various example embodiments are described below.

In a first example, the region and mode information is used in determining context for the upper-left-most coefficient group only:

ctxInc(Run)=intraModeRegionIdx*10+min(4,(absSum+1)/2)*2+min(1, binIndex), if top-left CG min(4,(absSum+1)/2)*2+min(1,binIndex)+60,otherwise In a second example, the region and mode information is used for determining context for all coefficient groups:

ctxInc(Run)=intraModeRegionIdx*10+min(4,(absSum+1)/2)*2+min(1,binIndex),if top-left CG intraModeRegionIdx*10+min(4,(absSum+1)/2)*2+min(1,binIndex)+60, otherwise In a third example, the region and mode information is used to determine context for the upper-left-most coefficient group, and other coefficient groups rely upon the diagonal partition (as shown in FIG. 16):

If(region(positionCurrentPair,binIndexCurrentRun)
    ==A)

regioninCGIdx=0;

else regioninCGIdx=1;

ctxInc(Run)=intraModeRegionIdx*10+min(4,(absSum+1)/2)*2+min(1,binIndex),if top-left CG regioninCGIdx*10+min(4,(absSum+1)/2)*2+min(1,binIndex)+60, otherwise In a fourth example, the region-based context determination is applied to all coefficient groups. The regional divisions depend on intra-prediction mode:

If (intraModeRegionIdx=INTRA_PRED_VER_A||intraModeRegionIdx=INTRA_PRED_HOR_All intraModeRegionIdx=INTRA_PRED_DC_DIAG_A)

regioninCGIdx=0;

else regioninCGIdx=1;

ctxInc(Run)=regioninCGIdx*10+min(4,(absSum+1)/2)*2+min(1,binIndex), if top-left CG regioninCGIdx*10+min(4,(absSum+1)/2)*2+min(1,binIndex)+20, otherwise In a fifth example, the region-based context determination is used in connection with all coefficient groups and the region depends on intra-prediction mode and, further, upon whether the current bin corresponds to the DC component in the upper-left-most coefficient group. Effectively, a third region is defined that contains only the DC component of the transform block. Example pseudo-code may be:

If (region(positionCurrentPair,binIndexCurrentRun)
    ==DC_in_top-left-CG) regioninCGIdx=0;

else if (intraModeRegionIdx=INTRA_PRED_VER_A||intraModeRegionIdx=INTRA_PRED_HOR_A||intraModeRegionIdx=INTRA_PRED_DC_DIAG_A)

regioninCGIdx=1;

else regioninCGIdx=2;

ctxInc(Run)=regioninCGIdx*10+min(4,(absSum+1)/2)*2+min(1,binIndex), if top-left CG (regioninCGIdx−1)*10+min(4,(absSum+1)/2)*2+min(1,binIndex)+30, otherwise It will be appreciated from the foregoing description that there are various other examples and embodiments involving different combinations or sub-combinations of conditions.

Context Derivation for Last Position Coding

As described above, in some example embodiments runs are truncated at a coefficient group boundary. As a result, in some embodiments the position of the last non-zero coefficient in each coefficient group may be signaled. In some other embodiments, of each coefficient group a 'last run' is signaled that reflects the number of zero coefficients in reverse scan order from the bottom-rightmost corner of that coefficient group to the last non-zero coefficient in that coefficient group, as denoted 512 in FIG. 6. Either of these syntax elements may be coded using a context derived, at least in part, using the intra-prediction mode.

With respect to x-y coordinate-based last coefficient position coding, in a first example, the intra-prediction mode may be used in combination with regionIndex (which indicates where in the transform block the current coefficient group is located, as described earlier above), as follows:

ctxInc(lastPositionX)=(regionIndex<3)*(intraModeIdx+1)*6+binIndex ctxInc(lastPositionY)=(regionIndex<3)*(intraModeIdx+1)*6+binIndex+3

In a second example, the intra-prediction mode may be used without reference to regionIndex:

ctxInc(lastPositionX)=intraModeIdx*6+binIndex ctxInc(lastPositionY)=intraModeIdx*6+binIndex+3

In a third example, the regionIndex is used, and intra-prediction mode is applied just in the case of the upper-left-most coefficient group:

If CG is the top-left CG:

ctxInc(lastPositionX)=intraModeIdx*6+binIndex ctxInc(lastPositionY)=intraModeIdx*6+binIndex+3 else ctxInc(lastPositionX)=(regionIndex<3)*6+binIndex+18 ctxInc(lastPositionY)=(regionIndex<3)*6+binIndex+3+18

Other examples will be appreciated in light of the foregoing description.

With respect to 'last run' coding, in a first example region may be used together with rank:

If (binIndex==0)

ctxInc(lastRun)=rank, if top-left CG rank+5, otherwise else ctxInc(lastRun)=intraModeRegionIdx*5+rank+10, if top-left CG intraModeRegionIdx*5+rank+40, otherwise In a second example, the intra-coding mode partitioning and region-based context determination is applied to the upper-left-most coefficient group as well:

If(intraModeRegionIdx=INTRA_PRED_VER_A||intraModeRegionIdx=INTRA_PRED_HOR_A||intraModeRegionIdx=INTRA_PRED_DC_DIAG_A)

regioninCGIdx=0;

else regioninCGIdx=1;

If (binIndex==0)

ctxInc(lastRun)=rank, if top-left CG rank+5, otherwise else ctxInc(lastRun)=regioninCGIdx*5+rank+10, if top-left CG regioninCGIdx*5+rank+20, otherwise Other examples will be appreciated in light of the foregoing description.

It will be appreciated that the decoder and/or encoder according to the present application may be implemented in a number of computing devices, including, without limitation, servers, suitably-programmed general purpose computers, audio/video encoding and playback devices, set-top television boxes, television broadcast equipment, and mobile devices. The decoder or encoder may be implemented by way of software containing instructions for configuring a processor to carry out the functions described herein. The software instructions may be stored on any suitable non-transitory computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of decoding video from a bitstream of encoded video using a video decoder, the video including a picture partitioned into blocks, the method comprising:
for a coefficient group of a plurality of non-overlapping coefficient groups within a transform block, the transform block corresponding to one of the blocks of the picture:
decoding data identifying an intra-coding mode used in generating the transform block;
partitioning the coefficient group into regions based on the intra-coding mode used in generating the transform block; and
entropy decoding a bin for reconstructing the coefficients of the coefficient group, wherein the entropy decoding includes determining a context based upon in which of the regions of the coefficient group a coefficient associated with that bin is located.

2. The method claimed in claim 1, wherein the video decoder is configured to use a plurality of intra-coding modes, wherein the plurality of intra-coding modes are grouped into classes, and wherein identifying includes identifying the class that the identified intra-coding mode belongs to.

3. The method claimed in claim 2, wherein each class has a respective predefined partition for partitioning coefficient groups into regions, and wherein partitioning the coefficient group comprises using the predefined partition associated with the identified class.

4. The method claimed in claim 2, wherein the classes include a vertical class, a horizontal class, and a diagonal class.

5. The method claimed in claim 4, wherein the horizontal class is associated with a partition that divides the coefficient group into two regions using a vertical line.

6. The method claimed in claim 4, wherein the vertical class is associated with a partition that divides the coefficient group into two regions using a horizontal line.

7. The method claimed in claim 1, wherein the bin comprises a bin of a binarized level value, and wherein one of the regions is associated with that bin on the basis that a non-zero coefficient corresponding to that level value is located in said one of the regions.

8. The method claimed in claim 1, wherein the bin comprises a bin of a binarized run value.

9. The method claimed in claim 8, wherein the bins of the binarized run value are mapped one-to-one to coefficients in a reverse scan order starting from a current non-zero coefficient, and wherein one of the regions is associated with one of the bins on the basis that the coefficient mapped to said one of the bins is located in said one of the regions.

10. The method claimed in claim 1, further comprising decoding last position information regarding a last non-zero coefficient in scan order within the coefficient group, wherein the decoding last position information occurs prior to said entropy decoding.

11. A decoder for decoding a bitstream of encoded video, the decoder comprising:
   a processor;
   a memory; and
   a decoding application stored in memory and containing instructions for configuring the processor to perform the method claimed in claim 1.

12. A non-transitory processor-readable medium storing processor-executable instructions which, when executed, configures one or more processors to perform the method claimed in claim 1.

13. A method of encoding video using a video encoder, the video including a picture partitioned into blocks, the method comprising:
   generating residual data for one of the blocks of the picture from spatial prediction of that block using an intra-coding mode;
   spectrally transforming the residual data to obtain a transform block of transform coefficients corresponding to the one of the blocks of the picture, the transform block being further partitioned into a plurality of non-overlapping coefficient groups;
   level-run coding the transform coefficients of one of the coefficient groups to generate level-run pairs; and
   binarizing and entropy coding the level-run pairs, including determining a context for each bin of the binarized level-run pairs, wherein the one of the coefficient groups is partitioned into regions based on the intra-coding mode, and wherein determining the context for a bin is at least partly based upon in which of the regions of the coefficient group a coefficient associated with that bin is located.

14. The method claimed in claim 13, wherein the intra-coding mode is selected from among a plurality of intra-coding modes, wherein the plurality of intra-coding modes are grouped into classes, and wherein determining the context includes determining how the coefficient group is partitioned into regions based on to which class the intra-coding mode belongs.

15. The method claimed in claim 14, wherein each class has a respective predefined partition for partitioning coefficient groups into regions.

16. The method claimed in claim 14, wherein the classes include a vertical class, a horizontal class, and a diagonal class.

17. The method claimed in claim 16, wherein the horizontal class is associated with a partition that divides the coefficient group into two regions using a vertical line.

18. The method claimed in claim 16, wherein the vertical class is associated with a partition that divides the coefficient group into two regions using a horizontal line.

19. The method claimed in claim 13, wherein the bin comprises a bin of a binarized level value, and wherein one of the regions is associated with that bin on the basis that a non-zero coefficient corresponding to that level value is located in said one of the regions.

20. The method claimed in claim 13, wherein the bin comprises a bin of a binarized run value.

21. The method claimed in claim 20, wherein the bins of the binarized run value are mapped one-to-one to coefficients in a reverse scan order starting from a current non-zero coefficient, and wherein one of the regions is associated with one of the bins on the basis that the coefficient mapped to said one of the bins is located in said one of the regions.

22. The method claimed in claim 13, further comprising encoding last position information regarding a last non-zero coefficient in scan order within the coefficient group, and wherein the encoding last position information occurs prior to said binarizing and entropy decoding.

23. A encoder for encoding a video in a video encoder, the encoder comprising:
   a processor;
   a memory; and
   an encoding application stored in memory and containing instructions for configuring the processor to perform the method claimed in claim 13.

24. A non-transitory processor-readable medium storing processor-executable instructions which, when executed, configures one or more processors to perform the method claimed in claim 13.

* * * * *